United States Patent [19]

Boutaghou et al.

[11] Patent Number: 5,732,215
[45] Date of Patent: Mar. 24, 1998

[54] SYSTEM FOR EQUALIZING OPERATING TEMPERATURE BY ALLOCATING INFREQUENTLY ACCESSED DATA TO THE HIGH TEMPERATURE DASD AND ALLOCATING FREQUENTLY ACCESSED DATA TO THE LOW TEMPERATURE DASD

[75] Inventors: Zine-Eddine Boutaghou, Owatonna; Hal Hjalmar Ottesen, Rochester, both of Minn.

[73] Assignee: International Business Machines Corporation, Armonk, N.Y.

[21] Appl. No.: 482,821

[22] Filed: Jun. 7, 1995

[51] Int. Cl.$^6$ .................................................. G06F 13/00
[52] U.S. Cl. ...................... 395/200.13; 395/441; 395/675
[58] Field of Search ................................ 360/78.07, 78.06; 369/44.25; 340/584, 585; 374/141; 395/600, 441, 182.04, 404

[56] References Cited

U.S. PATENT DOCUMENTS

| | | | |
|---|---|---|---|
| 4,754,397 | 6/1988 | Varaiya et al. | 361/685 |
| 5,115,225 | 5/1992 | Dao et al. | 340/584 |
| 5,325,497 | 6/1994 | Jaffe et al. | 395/441 |
| 5,424,720 | 6/1995 | Kirkpatrick | 340/585 |
| 5,433,525 | 7/1995 | El-Ibiary | 374/141 |
| 5,506,986 | 4/1996 | Healy | 395/600 |
| 5,530,658 | 6/1996 | Hafner et al. | 364/578 |
| 5,574,851 | 11/1996 | Rathunde | 395/182.05 |
| 5,584,018 | 12/1996 | Kamiyama | 395/492 |

FOREIGN PATENT DOCUMENTS

| | | |
|---|---|---|
| 046178 | 5/1992 | European Pat. Off. |
| 0520766 | 12/1992 | European Pat. Off. |
| 3245392 | 10/1991 | Japan |

OTHER PUBLICATIONS

IBM Technical Disclosure Bulletin, vol. 36, No. 06A, Jun. 1993, pp. 553–555, "Integrated Disk Management to Provide High Performance Logical Drives for Multiple Accesses and Large Sequential Accesses to a Multi-Disk Storage Subsystem".

Patterson et al., "A Case for Redundant Arrays of Inexpensive Disks (RAID)", ACM Sigmod Conference, Chicago, Illinois, Jun. 1–3, 1988.

Proceedings of the 1991 ACM Sigmod International Conference on Management of Data, Denver, CO, "Dynamic File Allocation in Disk Arrays", Weikum et al, pp. 406–415.

Proceedings of the 1991 ACM Sigmod International Conference on Management of Data, Denver, CO, "Dynamics File Allocation in Disk Arrays", Weikum et al, pp. 406–415.

Primary Examiner—Thomas C. Lee
Assistant Examiner—Anderson I. Chen
Attorney, Agent, or Firm—Philip M. Kolehmainen

[57] ABSTRACT

An array of direct access storage devices (DASD's) such as disk drive units includes a temperature sensor for sensing the operating temperature of each DASD. The operating temperatures of the DASD's of the array are equalized by allocating frequently accessed data to drives with relatively low operating temperature and allocating infrequently accessed data to drives with relatively high operating temperatures. Operating temperature information is used to identify a DASD that has a high probability of failure and the DASD can be shut down for replacement prior to actual failure by moving all data from that DASD to one or more other DASD's of the array.

11 Claims, 5 Drawing Sheets

SYSTEM FOR EQUALIZING OPERATING TEMPERATURE BY ALLOCATING INFREQUENTLY ACCESSED DATA TO THE HIGH TEMPERATURE DASD AND ALLOCATING FREQUENTLY ACCESSED DATA TO THE LOW TEMPERATURE DASD

FIELD OF THE INVENTION

The present invention relates to the control of an array of direct access storage devices (DASD's) and more particularly to methods and apparatus for equalizing the operating temperatures of DASD's of the array.

DESCRIPTION OF THE PRIOR ART

Data processing systems frequently use direct access storage devices (DASD's) for non-volatile data storage. Although other types of DASD's are known, one widely used type of DASD is a disk drive unit or file having a case or housing containing disks rotated by a spindle motor. Heads are moved relative to the disks by an actuator motor to write data to or read data from a data storage media such as a magnetic media upon the disks. Buffering of data flowing to or from the disks, and local control functions such as motor drive commands are provided by electronic circuitry associated with the DASD.

Arrays of DASD's of relatively smaller capacity can have advantages in many applications over a single DASD of relatively large capacity. Patterson et al., "A Case for Redundant Arrays of Inexpensive Disks (RAID)", ACM SIGMOD Conference, Chicago, Ill., Jun. 1–3, 1988 describe advantages and operating principles of such arrays. Arrays of this type have become common for larger computer systems such as mainframes, client servers, and local area or wide area networks.

A DASD array typically includes an array controller that communicates with the host system and with the individual DASD's of the array. The array controller processes data read and write commands issued by the host system and supervises the accesses to the DASD's used to execute the read and write commands. In addition, known array controllers perform other maintenance and supervisory functions such as allocating among DASD's the data contained in data files and reconstructing data and files of data in the event that a DASD of the array fails and requires replacement.

Elevated spindle motor bearing temperatures can result in DASD failure. Spindle bearing temperature increases are caused by power dissipated in the spindle motor, in the head actuator motor and in the local electronics. Although fan cooling is normally employed in DASD arrays, the cooling effect may not be uniform among all DASD's of the array. It has been recognized that high spindle bearing temperatures are very detrimental to bearing life, and that spindle bearing failure rates rise exponentially with increased spindle bearing temperature.

The trend toward higher disk rotational speeds, in the range of ten thousand revolutions per minute or more, exacerbates the problem of spindle bearing heat. To achieve synchronization in an array, all the DASD's should rotate at the same speed. Attempting to avoid high operating temperatures by reducing the rotational speed of all spindle motors of the array would undesireably increase data access times. Similarly, decreasing the frequency of data access operations to limit actuator motor and local electronic circuit functions would impede data flow.

Known high performance DASD arrays are fault tolerant to the extent that after a DASD failure due to elevated spindle bearing temperatures, a substituted DASD can be supplied by the array controller with reconstructed data and data is not lost. However, this reactive approach is not capable of anticipating or preventing DASD failure before it occurs.

SUMMARY OF THE INVENTION

A principal object of the present invention is to provide a DASD array and method in which the incidence of spindle bearing temperature related DASD failures is reduced and wherein array reliability and availability are improved. Other objects of the invention are to provide an array and method wherein the operating temperatures of the DASD's of the array are equalized to prevent premature failure of relatively higher temperature DASD's; to provide a DASD array and method in which DASD failure can be anticipated and the necessity for data reconstruction can be avoided; and to provide a DASD array and method overcoming heat related failure problems of known arrays.

In brief, in accordance with the present invention, there is provided a method for minimizing heat related failures of DASD's in a data storage DASD array. In this method, the operating temperatures of the DASD's in the array are sensed and the operating temperatures of the DASD's in the array are equalized by allocating infrequently accessed data to the DASD's having relatively high temperature and allocating frequently accessed data to the DASD's having relatively low temperature.

In brief, in accordance with another aspect of the present invention there is provided a DASD array for storing data provided in data write commands by a host system and for supplying to the host system stored data requested in data read commands received from the host system. The DASD array includes a plurality of DASD's each including a data storage medium, a head for writing data to the medium and for reading data from the medium, a medium drive motor for moving the medium, a head drive motor for moving the head and an electronic circuit including means for buffering data and means for providing electrical signals to the head and the motors. An array controller connected to the host system and connected to the plurality of DASD's includes means for receiving data write commands and data read commands from the host system and includes means for accessing the DASD's to write or read data in response to data write or data read commands. The DASD array is characterized by a temperature sensor disposed at each of the DASD's and exposed to DASD operating temperature resulting from heat dissipated by the medium drive motor, the head drive motor and the electronic circuit. The array controller includes means connected to the sensors for identifying the one of the DASD's having the highest operating temperature. The array controller includes means for recording the access frequency of data stored in the array. The array includes means for reducing the operating temperature of the one DASD by allocating low access frequency files to the one DASD.

BRIEF DESCRIPTION OF THE DRAWINGS

The present invention together with the above and other objects and advantages may best be understood from following detailed description of the preferred embodiment of the invention illustrated in the drawings, wherein.

DETAILED DESCRIPTION OF THE PREFERRED EMBODIMENTS

Figure 1:
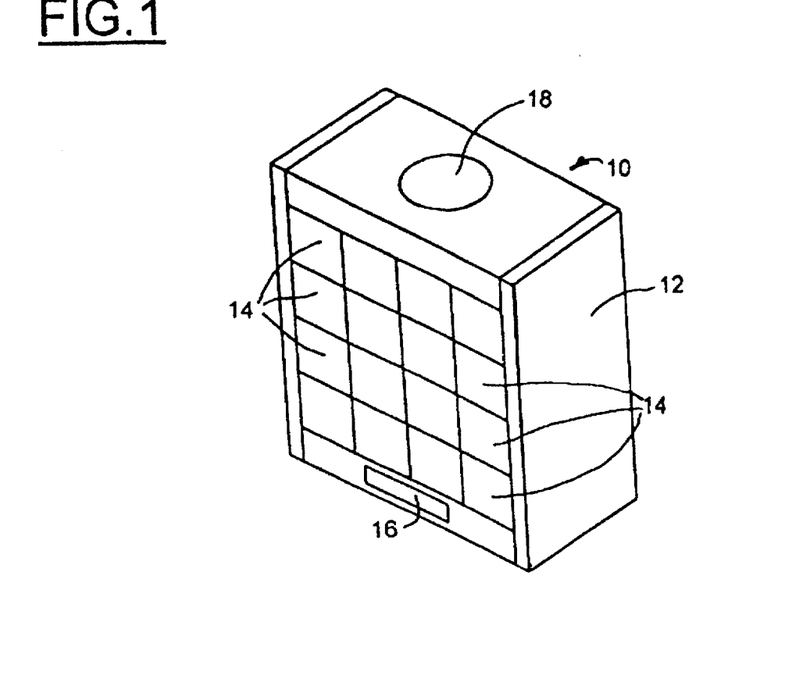
FIG. 1 is a schematic and diagrammatic illustration of a DASD array constructed in accordance with the present invention.

Having reference now to the drawings, in FIG. 1 there is illustrated a DASD array generally designated as 10 and constructed in accordance with the principles of the present invention. The array 10 includes an enclosure 12 containing a number of discrete DASD's 14 that, for example, may be drawer mounted or the like. In order to cool the DASD's 14 in the array 10, the enclosure 12 is provided with one or more venting openings 16 through which air is moved by one or more fans 18. In the illustrated arrangement there are sixteen DASD's 14, all similar to one another, but other configurations are possible.

Figure 2:
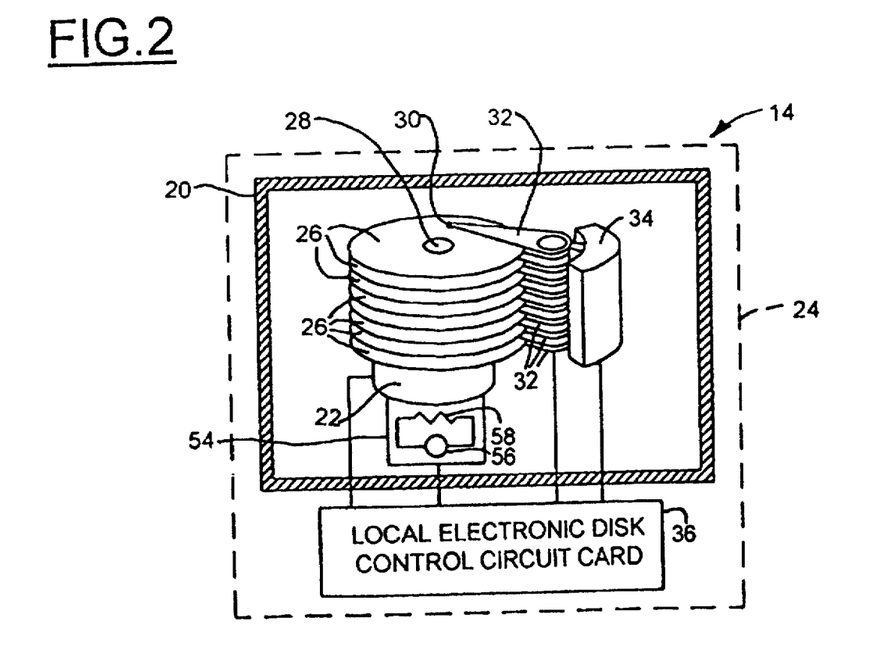
FIG. 2 is a schematic and diagrammatic illustration of one DASD of the array of FIG. 1.

One of the discrete DASD's 14 is illustrated in FIG. 2. A sealed enclosure 20 contains plurality of disks 26 having magnetic data storage surfaces. The disks 26 are mounted for rotation on a central drive spindle motor 28 having an integrated bearing housing 22 shown schematically in FIG. 2. Alternatively, optical or other data storage media could be used. The motor 28 rotates all of the disks 26 in common at a relatively high rotational speed such as ten thousand revolutions per minute or more.

A plurality of read-write heads 30 are each mounted on one of a plurality of pivotable flexures or arms 32. One head 30 moves across each opposed surface of each disk 28. In the illustrated arrangement there are eight disks 26 and sixteen arms 32 and heads 30. An actuator motor 34 moves all of the arms 32 simultaneously to position the heads 30 in registration with selected regions or segments of the surfaces of the disks 26. One surface of one disk 26 may contain coded position tracking data, and the corresponding head 30 may be used for feedback servo position control.

A local electronic disk control circuit card 36 is supported adjacent the enclosure 20 by a support frame 24 of any conventional type, indicated by a dashed line in FIG. 2. The circuitry on card 36 provides local control functions including buffering of the data flow for read and/or write operations, control of the flow of data to and from the heads 30, and control of the spindle motor 28 and of the actuator motor 34.

Power is dissipated during operation of the DASD 14 by the spindle motor 28, by the read-write head actuator motor 34 and by the local electronic control 36. Each of these power dissipating components contributes heat to the interior of the enclosure 20, and this heat results in increased bearing temperature of the spindle drive motor 28. Because high spindle drive motor temperatures can cause seizure of the bearings of the spindle drive motor 30 and failure the DASD 14, heat is removed from the DASD 14 by cooling air flow moved by fan 18 through the enclosure 12. Heat exchange between the walls of enclosure 20 and the flow of air reduces the operating temperature of the spindle drive motor 28.

Figure 3:
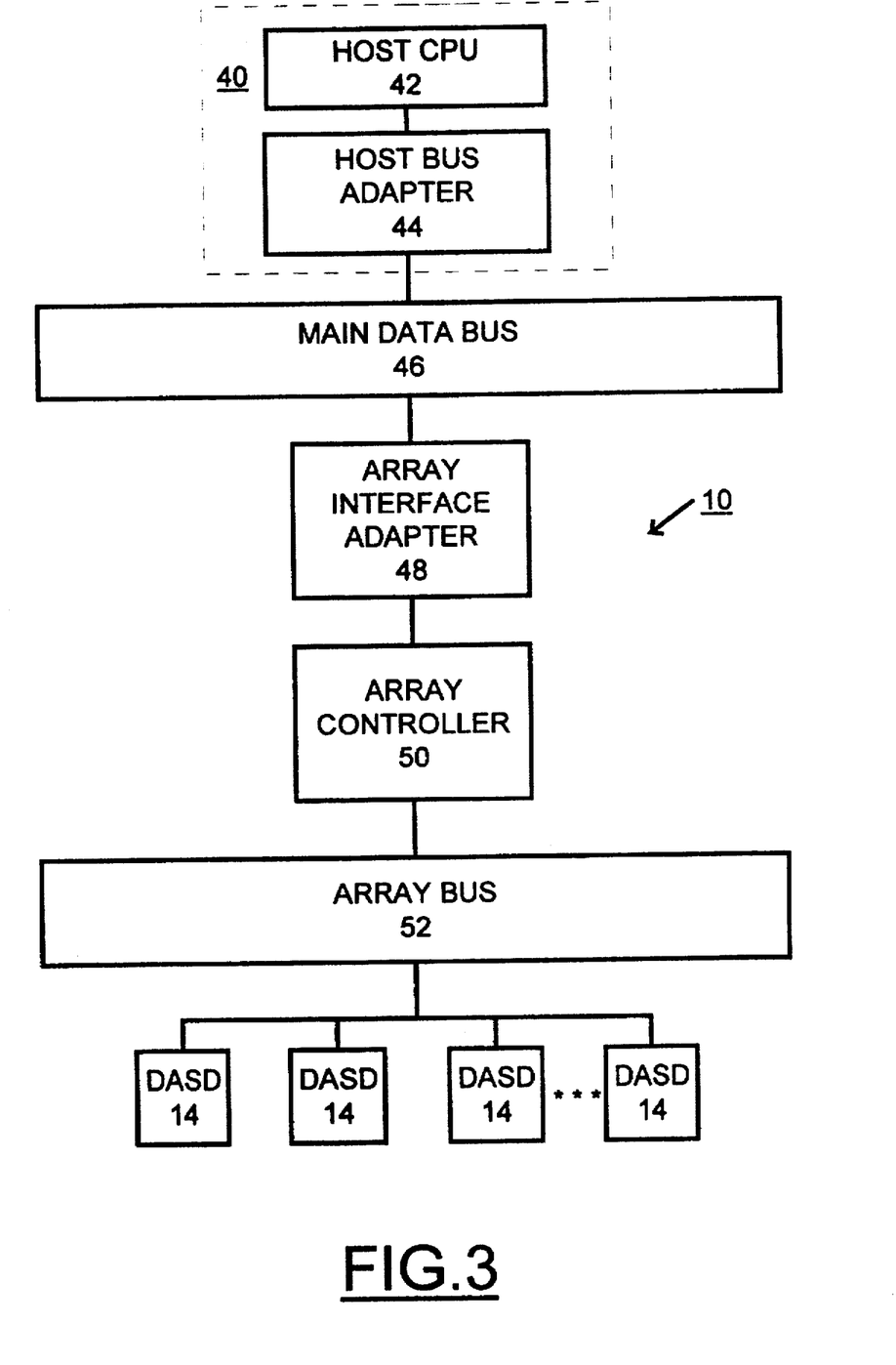
FIG. 3 is a block diagram of the array of FIG. 1 together with a host data processing system associated with the array.

In FIG. 3 there is illustrated in block diagram form the DASD array 10 and an associated host computer or data processing system 40. Host system 40 includes a central processing unit (CPU) 42 and other conventional components (not shown). An adapter 44 provides an interface between the CPU 42 and a main data bus or channel 46. The bus 46 permits communication between the CPU 42 and other suitable components coupled to the bus such as a monitor, keyboard console, printer, network adapter and the like.

The DASD array 10 includes an array interface adapter 48 connected between a central array controller 50 and the main data bus 46. A dedicated array bus 52 enables communications between the array controller 50 and the local control circuits 36 (FIG. 2) of each DASD 14. The array 10 provides non-volatile data storage for the host system 40. The host system 40 stores data such as data files in the array 10 and retrieves stored data from the array 10 through the adapters 44 and 48 and the bus 46.

In a typical arrangement, the CPU 42 can issue a data write command to the array controller 50. The write command can include data to be stored in the array 10 as well as other information. The array controller 50 executes a write command by selecting one or more DASD's 14 as the storage destination for the data to be stored, and communicating across the array bus 52 to the selected DASD or DASD's 14. The data is written to one or more disks 26 by one or more heads 30 under the control of the local control circuit or circuits 36 of the selected DASD's. In accordance with known practice, parity information may also be stored in the array 10 so that stored data can be reconstructed by the array controller 50 in the event of failure of a DASD 14. The Patterson et al. article cited above provides more information about schemes for storing parity information and reconstructing lost data, and is incorporated here by reference.

The CPU 42 can also issue a data read command to the array controller through the adapters 44 and 48 and the main data bus 46. A read command may include physical or logical data address information, among other information. The array controller 50 executes a read command by communicating across the array bus 52 with the DASD or DASD's 14 where the requested data is written. Under the control of the associated local controls 36, the data is read from one or more disks 26 by one or more heads 30 and is communicated by way of the array controller 50 to the CPU.

The heat resulting from power dissipated by the motors 28 and 34 and by the electronic circuits 36 varies in accordance with file access frequency. There is a tendency for the most frequently accessed DASD's to have the highest temperature. Although array controller strategies have been proposed for equalizing DASD access or loading in an array, such approaches have not solved the problem of unanticipated spindle motor failure due to elevated temperatures.

It may not be efficient or even possible to provide sufficient cooling ventilation to maintain the bearings of the spindle drive motors 28 of all of the DASD's below a desired maximum temperature under all conditions. It is desirable to limit the expense and power consumption of cooling fans and other air conditioning equipment, and as a result excessive cooling is not desirable. The flow of cooling air to all DASD's 14 of the array 10 may not be uniform. The physical properties and friction of all DASD's may not be uniform. Consequently, even if DASD access frequencies are equal, the DASD's may have different operating temperatures, and the DASD's with higher temperatures are prone to premature failure.

In accordance with the present invention, each DASD 14 of the array 10 is provided with a dedicated temperature sensor 54. As seen in FIG. 2, each sensor 54 may include a constant current source 56 driving a heat responsive resistor 58 that is mounted in intimate thermal conduction proximity to the spindle bearing housing 22. In other types of DASD's that may not use spindle disk drive motors, other operating temperatures having an effect on DASD failure may be sensed. In the preferred arrangement, the voltage across the resistor 58 is dependent upon the spindle bearing operating temperature of the corresponding DASD 14. This temperature dependent information is maintained in the local electronic disk control 36. The array controller 50 regularly and periodically polls each DASD 14 by communication over the array bus 52 and retrieves current DASD temperature data for each DASD.

The array controller 50 uses the DASD operating temperature data in order to reduce heat related DASD failures and to prevent unanticipated failures. In accordance with the invention, the controller equalizes the operating temperatures of all of the DASD's in the array by allocating data requiring frequent access to DASD's having relatively low operating temperatures and correspondingly by allocating data requiring relatively infrequent access to those DASD's having relatively high temperatures.

More specifically, the array controller 50 periodically identifies the DASD 14 having the highest operating temperature. In addition, the controller 50 maintains and continually updates a running list or log including data access frequency information. As part of its array maintenance and control procedure, the controller 50 moves high access files from the DASD 14 having the highest operating temperature to one or more other DASD's. As a result, data accesses to that DASD are decreased in frequency, and the operating temperature of the DASD falls. When a different DASD becomes the one having the highest operating temperature, high access data is moved in turn from that DASD. The result of these reiterative data transfer operations is to equalize the operating temperature of all the DASD's 14 in the array 10. Thus, overheating of the spindle motors 28 is prevented and DASD failures are minimized.

The array controller 50 also uses the DASD operating temperature to anticipate unavoidable DASD failure and minimize failure related problems. If the operating temperature of a DASD 14 of the array 10 cannot be lowered to an equalized temperature by transfer of high access frequency files, the controller 50 monitors its operating temperature and can anticipate failure before it occurs. For example, the controller 50 can determine that failure is likely after a DASD has accumulated a predetermined time of operation in an elevated temperature condition.

Before DASD failure occurs, the controller 50 can shut down the subject DASD 14 in an orderly and efficient manner. More specifically, the controller 50 can copy all data on the DASD to one or more other DASD's 14 of the array 10 and issue a command for the DASD to be replaced. When a replacement drive is in place, normal operation resumes and the data from the replaced drive is available without the necessity for reconstructing the data from parity information.

Figure 4:
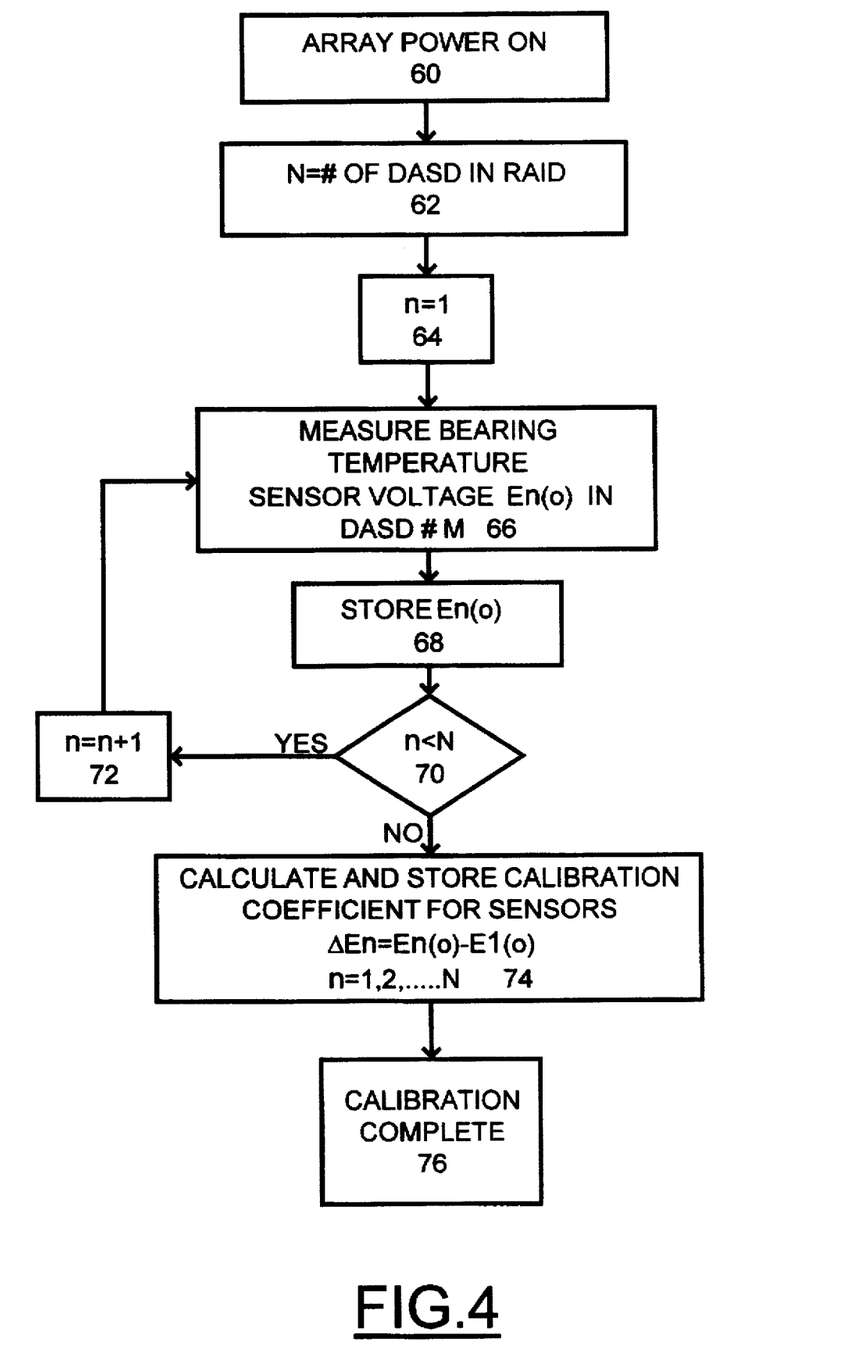
FIG. 4 is a flow chart illustrating a routine for calibrating temperature sensors associated with the DASD's of the array of FIG. 1.

In order to assure accuracy of the DASD temperatures sensed by the sensors 54, preferably the sensors 54 are calibrated to provide consistent temperature information despite variables such as resistance variations of the resistors 58. The sensors are calibrated by determining the voltage across each resistor 58 when all of the resistors 58 are at the same temperature. FIG. 4 is a flow chart showing the calibration routine.

Sensor calibration can conveniently be carried out after a period of non-use of the array 10 when all the DASD's are at the same ambient temperature. For this reason, as indicated by block 60 in FIG. 4, the calibration routine is performed at startup, when power to the array is turned on. Memory variable N is set equal to the number of DASD's in the array 10 in block 62, and n is initially set to 1 in block 64. In block 66, the sensor voltage across resistor 58 in the first DASD, i.e., DASD 1, designated $E_1$ (0) is measured, and, as seen in block 68, is stored for future reference in memory. Until n reaches the value of N, as compared in block 70, n is incremented in block 72 and the measurement and storing operations are repeated until all sensor voltages have been stored.

In block 74, a calibration coefficient $\Delta E_n$ is calculated for each sensor. The sensed voltage $E_1$ (0) for the sensor of DASD 1 is selected as the norm and the calibration coefficient $\Delta E_n$ is equal to zero. The coefficient $\Delta E_n$ for each other sensor is calculated by subtracting $E_1$ (0) from the voltage value $E_n$ (0) for each other sensor. The coefficients $\Delta E_1$ through $\Delta E_n$ are stored in memory for future use. As indicated in block 76, this completes the sensor calibration routine, and other conventional array startup routines such as controlled spin up of the individual DASD's 14 can be performed.

Figure 5:
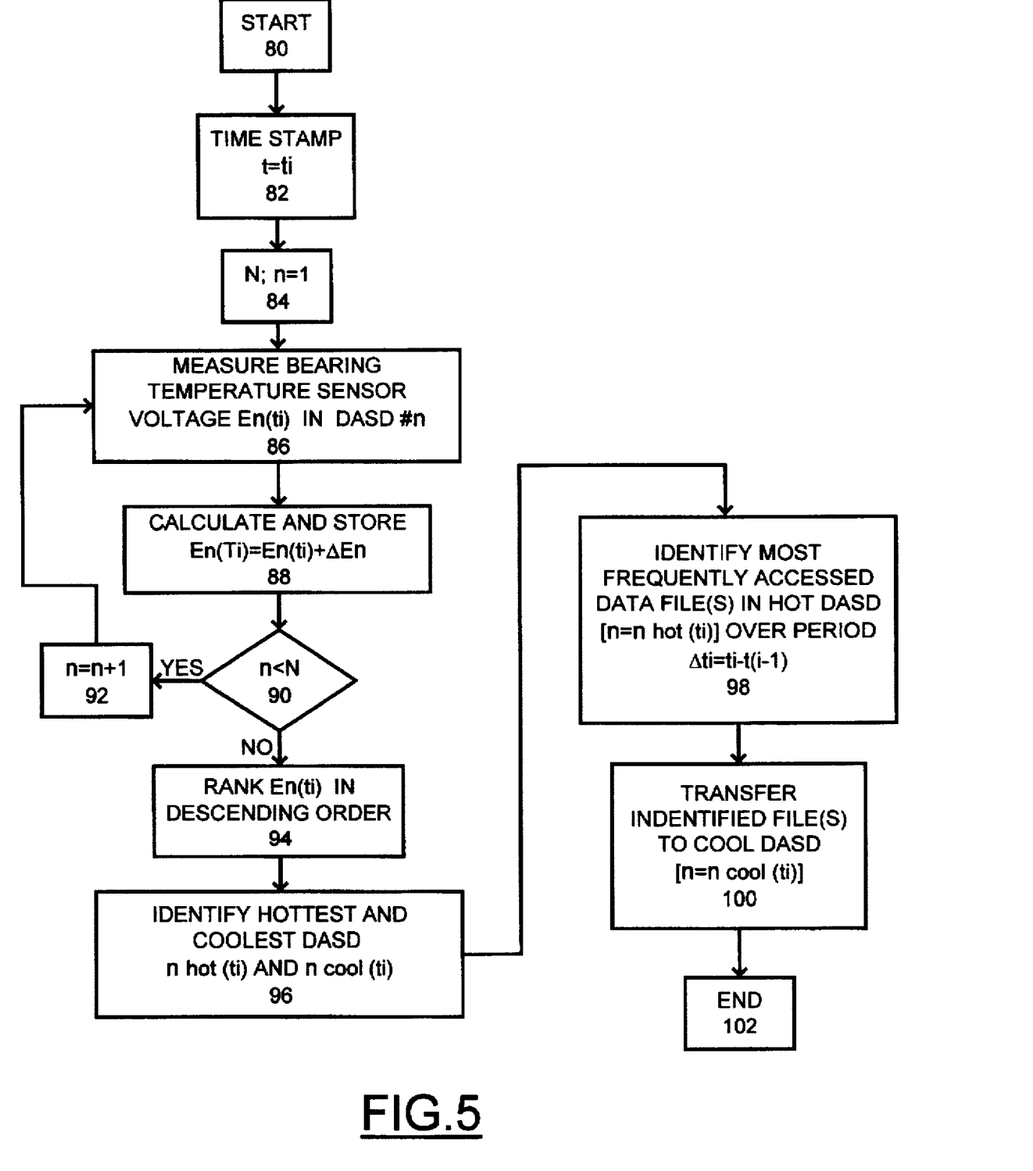
FIG. 5 is a flow chart illustrating a routine for ranking DASD's of the array of FIG. 10 in accordance with temperature and for equalizing DASD temperatures by allocating frequently accessed data to relatively cooler DASD's.

FIG. 5 illustrates a periodically repeated routine for equalizing the spindle bearing operating temperatures of the DASD's 14 of the array 10. The routine starts in block 80 at regular periodic intervals, for example every five minutes. A time stamp $t_i$ is established in block 82 for attachment to the temperature measurements made in executing the routine of FIG. 5. The subscript "i" denotes the period index. Block 84 illustrates steps similar to those of blocks 62 and 64 above in preparation for incrementing through the DASD's 14. In block 86, the DASD's are polled in sequence and the sensed spindle temperature voltages $E_n$ ($t_i$) are obtained for each DASD. In block 88 the corrected actual operating temperature for each DASD 14 is calculated by adding the calibration coefficient $\Delta E_n$ to the sensed voltage. In blocks 90 and 92, the routine proceeds in sequence until an operating temperature is stored in memory for every DASD of the array 10.

The DASD's 14 are ranked in order of temperature in block 94, and in block 96 the hottest DASD and the coolest DASD are identified. As indicated above, the array controller 50 maintains a log or list of file accesses. In block 98 those files of data on the hottest DASD which have the higher access frequency are identified. The identification is made by counting file accesses occurring since the immediately previous execution of the FIG. 5 routine at time $t_{i-1}$. If desired, a longer period of time may be used for determining current file access frequency. The files identified as frequent access files are transferred form the hottest to the coolest DASD in block 100, after which the routine terminates in block 102.

Figure 6:
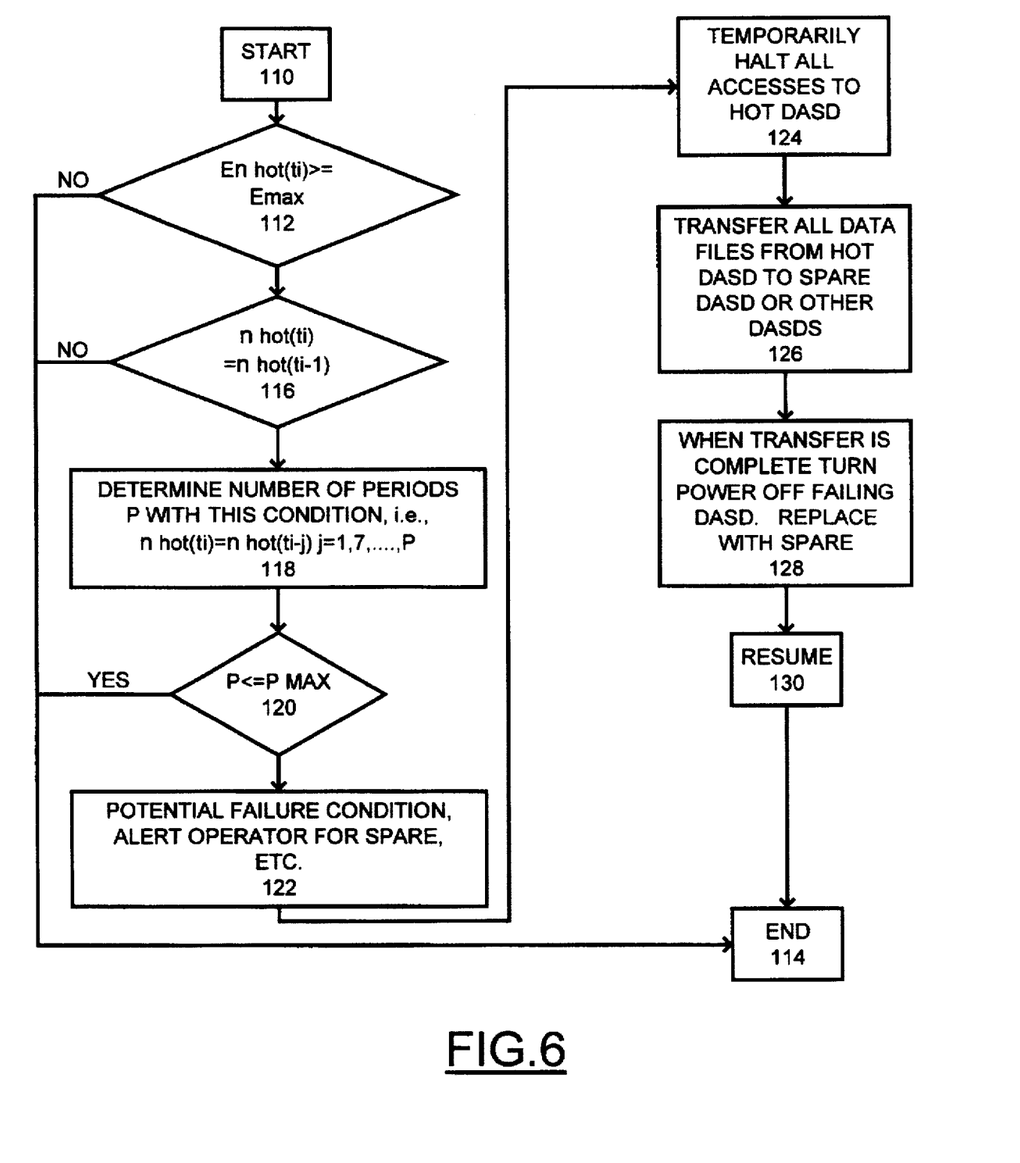
FIG. 6 is a flow chart of a routine for identifying and shutting down a failure prone DASD of the array before an actual failure takes place.

Normally, repetitive transfer of data having high current access requirements from hot to cool DASD's dynamically results in equalization of the spindle bearing operating temperatures of the DASD's 14. Temperature equalization increases bearing life by minimizing high temperature conditions. Nevertheless, spindle motor bearing failures can occur. FIG. 6 illustrates a routine for anticipating and minimizing disadvantages of such failures.

The routine of FIG. 6 starts at block 110, and can be executed at the conclusion of each execution of the FIG. 5 routine, or on any other periodic basis. The routine illustrated in FIG. 6 withdraws a DASD 14 from service when it has been determined that it has operated above a predetermined maximum spindle bearing operating temperature $E_{max}$ for longer than a predetermined maximum time period $P_{max}$. When this condition occurs, failure is anticipated and the failure prone DASD 14 is emptied of data and replaced.

In block 96 of FIG. 5, the hottest DASD 14 is identified. In block 112 of FIG. 6, the temperature of that hottest DASD is compared to the maximum temperature $E_{max}$ and the routine terminates at block 114 if the comparison establishes that the maximum temperature is not exceeded. Conversely if the DASD operating temperature reaches the maximum, then a determination is made in block 116 whether or not the present hottest DASD was also the hottest DASD during the previous execution of the routine at time t−1. If not the routine terminates. If the same DASD is determined in block 116 to have been the hottest in sequential executions of the routine, then in block 118 variable P is set to equal the number of time periods during which the DASD has been determined to have operated above the maximum temperature. If this time period P is less than the predetermined maximum time $P_{max}$ as determined at 120, the routine terminates. If the maximum temperature is exceeded for the maximum time period, then a potential failure condition is established.

Before an actual failure occurs, as indicated in block 122, the operator is alerted of the potential failure condition. In response to this alert, the operator can take action such as installing a spare if the array permits, or preparing a spare to be used to replace the DASD identified as a potential failure. In blocks 124 and 126, all further accesses to the failure prone DASD are discontinued, and all data files are transferred to a spare if available or to one or more other DASD's 14 of the array. If desired, the data files on the failure prone DASD that currently have the highest access frequency can be transferred to the coolest DASD as indicated in blocks 98 and 100 of FIG. 5. When the file transfer of block 128 is complete the DASD can be powered down, removed from the array 10 and replaced with a spare DASD. Then, as indicated in block 130, normal operation of the array 10 can resume and the routine terminates.

While the present invention has been described with reference to the details of the embodiments of the invention shown in the drawing, these details are not intended to limit the scope of the invention as claimed in the appended claims.

What is claimed is:

1. A method for minimizing heat related failures of DASD's in a data storage DASD array, said method comprising:

sensing the operating temperatures of the DASD's in the array; and equalizing the operating temperatures of the DASD's in the array by allocating infrequently accessed data to the DASD's having relatively high temperature and allocating frequently accessed data to the DASD's having relatively low temperature;

said sensing step comprising detecting the operating temperatures of the DASD's with temperature sensors located at each DASD in the array; and said detecting step including periodically polling each temperature sensor.

2. The method of claim 1, said detecting step including placing sensors in intimate heat transfer relationship with spindle motor bearings of the DASD's.

3. The method of claim 1 further comprising maintaining the sensors at a single temperature and calibrating the sensors.

4. A method for minimizing heat related failures of DASD's in a data storage DASD array, said method comprising:

sensing the operating temperatures of the DASD's in the array by detecting the operating temperature of the DASD's with temperature sensors located at each DASD in the array by periodically polling each temperature sensor; and equalizing the operating temperatures of the DASD's in the array by allocating infrequently accessed data to the DASD's having relatively high temperature and allocating frequently accessed data to the DASD's having relatively low temperature; and repetitively identify the one DASD in the array having the highest operating temperature, and said equalizing step including moving the frequently accessed data from the one DASD to at least one other DASD in the array.

5. The method of claim 4, said equalizing step further comprising identifying the one DASD in the array having the coolest operating temperature, and moving the frequently accessed data from the one DASD to the coolest DASD in the array.

6. The method of claim 4 further comprising maintaining a record of accesses to data stored in the array and using the record to locate frequently accessed data on the one DASD.

7. The method of claim 4 further comprising anticipating a heat related failure of the one DASD by monitoring the operating temperature of the one DASD and shutting down the one DASD if its operating temperature cannot be equalized.

8. The method of claim 7 wherein said shutting down step includes moving all data stored in the one DASD to at least one other DASD of the array having a cooler temperature than the one DASD.

9. A method for controlling the operating temperature of DASD's of a DASD array used for storing data, said method comprising:

sensing the operating temperature of each DASD in the array;

periodically detecting the one DASD of the array having the highest operating temperature by polling temperature sensors located at each DASD in the array;

maintaining a log of accesses to data in the array and consulting the log to locate frequently accessed data on the at least one DASD; and moving frequently accessed data away from at least one DASD having a relatively high operating temperature by moving frequently accessed data from the one DASD to at least one other DASD having a lower operating temperature.

10. A DASD array for storing data provided in data write commands by a host system and for supplying to the host system stored data requested in data read commands received from the host system, said DASD array comprising:

a plurality of DASD's each including a data storage medium, a head for writing data to said medium and for reading data from said medium, a medium drive motor for moving said medium, a head drive motor for moving said head and electronic circuit including means for buffering data and means for providing electrical signals to said head and said motors;

an array controller connected to the host system and connected to said plurality of DASD's and including means for receiving data write commands and data read commands from the host system and including means for accessing said DASD's to write or read data in response to data write or data read commands;

said DASD array being characterized by:
- a temperature sensor disposed at each of said DASD's and exposed to DASD operating temperature resulting from heat dissipated by said medium drive motor, said head drive motor and said electronic circuit;
- said array controller including means connected to said sensors for periodically and repetitively polling said sensors and identifying the one of said DASD's having the highest operating temperature;
- said array controller including means for recording the access frequency of data stored in the array; and
- means for reducing the operating temperature of said one DASD by allocating low access frequency files to said one DASD;
- said means for reducing including means for moving high access frequency files from said one DASD to at least one other DASD of the array.

11. A DASD array as claimed in claim 10, said array controller including means responsive to a failure to reduce the operating temperature of said one DASD for transferring all stored data from said one DASD to at least one other DASD of the array.

* * * * *